(12) United States Patent
Grisamore et al.

(10) Patent No.: US 12,348,143 B2
(45) Date of Patent: Jul. 1, 2025

(54) REMOTE CURRENT SENSE COMPENSATION IN MULTIPHASE VOLTAGE REGULATORS

(71) Applicant: Renesas Electronics America Inc., Milpitas, CA (US)

(72) Inventors: Robert Thomas Grisamore, Austin, TX (US); David Lynn Beck, Austin, TX (US); Kiran Gonsalves, Austin, TX (US); Nicholas John Havens, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 429 days.

(21) Appl. No.: 17/567,080

(22) Filed: Dec. 31, 2021

(65) Prior Publication Data

US 2023/0216411 A1   Jul. 6, 2023

(51) Int. Cl.
*H02M 3/158* (2006.01)
*G06F 1/12* (2006.01)
*G06F 1/3296* (2019.01)

(52) U.S. Cl.
CPC ............ *H02M 3/1584* (2013.01); *G06F 1/12* (2013.01); *G06F 1/3296* (2013.01)

(58) Field of Classification Search
CPC ............ H02M 3/00; H02M 3/02; H02M 3/04; H02M 3/10; H02M 3/135; H02M 3/137; H02M 3/139; H02M 3/142; H02M 3/145; H02M 3/155; H02M 3/156; H02M 3/1566; H02M 3/157; H02M 3/158; H02M 3/1582; H02M 3/1584; H02M 3/1586; H02M 1/0003; H02M 1/0009; H02M 1/0012; H02M 1/0016; H02M 1/0019; H02M 1/0025; H02M 1/0038; H02M 1/0043; H02M 1/0067; H02M 1/14; H02M 1/143; H02M 1/32; H02M 1/327; G06F 1/02; G06F 1/04; G06F 1/12; G06F 1/18; G06F 1/188; G06F 1/189; G06F 1/206;

(Continued)

(56) References Cited

U.S. PATENT DOCUMENTS 7,793,005 B1 *   9/2010   Fernald ..................... G06F 1/26
                                                  713/340
10,594,219 B2 *   3/2020   Mirjafari ................. H02M 1/32

(Continued)

*Primary Examiner* — Thienvu V Tran
*Assistant Examiner* — Carlos O Rivera-Perez
(74) *Attorney, Agent, or Firm* — SCULLY, SCOTT, MURPHY & PRESSER, P.C.

(57) ABSTRACT

Methods and systems for performing current sense compensation for one or more power stages in a multiphase voltage regulator are described. A controller can be connected to a plurality of power stages through a communication interface. The controller can generate a data packet including a command to obtain temperature information and an address that identifies a specific power stage among the plurality of power stages. The controller can send the data packet to the plurality of power stages using the communication interface. The controller can receive temperature information of the specific power stage from the specific power stage through the communication interface. The controller can compensate a sensed current of the specific power stage based on the received temperature information of the specific power stage.

20 Claims, 4 Drawing Sheets

(58) Field of Classification Search
CPC ... G06F 1/26; G06F 1/263; G06F 1/28; G06F 1/30; G06F 1/305; G06F 1/3206; G06F 1/3209; G06F 1/3228; G06F 1/3296; G05F 1/46; G05F 1/462; G05F 1/465; G05F 1/56; G05F 1/565; G05F 1/567; G05F 1/569; G05F 1/575; G05F 1/62
USPC .............. 323/222–226, 265, 266, 268, 269, 323/271–277, 282–285, 304, 311, 312, 323/351, 909; 363/65, 69, 70, 78, 79, 363/147; 713/300–400, 600
See application file for complete search history.

(56) References Cited

U.S. PATENT DOCUMENTS

| | | | |
|---|---|---|---|
| 11,228,248 B1* | 1/2022 | Zafarana | .................. H03K 5/08 |
| 2017/0115725 A1* | 4/2017 | Luo | ....................... G06F 1/3296 |

* cited by examiner

REMOTE CURRENT SENSE COMPENSATION IN MULTIPHASE VOLTAGE REGULATORS

BACKGROUND OF THE SPECIFICATION

The present disclosure relates in general to operations of power converters. More specifically, the present disclosure relates to remotely compensating current sense for power stages in a multiphase voltage regulator.

DC-to-DC voltage conversion may be performed by switching voltage regulators or power converters to convert a voltage from a higher level to a lower level that may be required by a load. An example architecture may distribute the higher voltage to multiple voltage regulators or power stages, and each voltage regulator may produce a same or different voltages for one or more loads. A switching voltage regulator may use two or more power transistors to convert energy from one voltage to another voltage. One example of such a switching voltage regulator may be the Buck Regulator, which typically switches a pair of power transistors to produce a square-wave at a common node between the pair of power transistors. The produced square-wave may be smoothed out using an resonant circuit (e.g., an inductor-capacitor (LC) circuit) to produce a desired voltage for a load. A feedback control loop may be configured to control a duty-cycle of the produced square-wave and a resulting value of an output voltage of the voltage converter.

An example voltage regulator architecture may be a multiphase voltage regulator including multiple power stages, and the power stages can be referred to as phases. Each power stage includes its own pair of power transistors (e.g., field-effect transistors (FET)), an inductor and a output capacitor connected to its output, and a controller. The voltage output from each activated power stage can be interleaved at an output node to produce an overall output voltage. The phases are connected in parallel, and different number of power stages can be activated for additional output current, thus providing different power levels to a load. Further, each power stage can measure parameters (e.g., inductor current and temperature) between the output node and the power stage's output. The measured parameters can be fed back to a master controller connected to the multiple power stages, and can be used by the master controller to maintain satisfying performance level of the overall system and to determine optimal number of power stages to be activated.

SUMMARY

In an embodiment, an apparatus for performing current sense compensation for one or more power stages in a multiphase voltage regulator is generally described. The apparatus can include a communication interface and a controller. The controller can be connected to a plurality of power stages in a multiphase voltage regulator. The controller can be configured to send a data packet to the plurality of power stages using the communication interface. The data packet can include a command to obtain temperature information and an address that identifies a specific power stage among the plurality of power stages. The controller can be further configured to receive temperature information of the specific power stage from the specific power stage through the communication interface. The controller can be further configured to compensate a sensed current of the specific power stage based on the received temperature information of the specific power stage.

In another embodiment, a system for performing current sense compensation for one or more power stages in a multiphase voltage regulator is generally described. The system can include a communication interface, a plurality of power stages, and a controller connected to the plurality of power stages through the communication interface. The controller can be configured to send a data packet to the plurality of power stages using the communication interface. The data packet can include a command to obtain temperature information and an address that identifies a specific power stage among the plurality of power stages. The controller can be further configured to receive temperature information of the specific power stage from the specific power stage through the communication interface. The controller can be further configured to compensate a sensed current of the specific power stage based on the received temperature information of the specific power stage.

In another embodiment, a method for performing current sense compensation for one or more power stages in a multiphase voltage regulator is generally described. The method can include generating, by a controller connected to a plurality of power stages though a communication interface, a data packet. The data packet can include a command to obtain temperature information and an address that identifies a specific power stage among the plurality of power stages. The method can further include sending, by the controller, the data packet to the plurality of power stages using the communication interface. The method can further include receiving, by the controller, temperature information of the specific power stage from the specific power stage through the communication interface. The method can further include compensating, by the controller, a sensed current of the specific power stage based on the received temperature information of the specific power stage.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

The increasing complexity of information exchange between a master controller and multiple power stages in a voltage regulator requires a more efficient technology to communicate this information. The master controller can generate and provide different pulse width modulation (PWM) signals to different power stages to manage the power stages. Voltage regulators can include discrete pins connecting each power stage to the master controller to pass power state control information, such as enable or disable control signals for activating or deactivating power stages. In an aspect, these power state control information can be handled by special PWM input signal signatures or power stage internal timeout mechanisms. However, these control signals typically do not provide individual power stage control. For example, control commands can be issued by the master controller to all power stages in parallel. Also, multifunction pins on the master controller and the power stages can be used for communicating information, such as fault signals, from the power stages to the master controller. However, these multifunctional pins tend to require complicated drive levels and input thresholds.

Power stages can endure large temperature changes and drive voltage changes during active voltage regulation. These changes cause changes in the on-resistance of the high and low side power transistors as well as changes in the threshold voltage of these devices. Maintenance of current sensing accuracy across these ranges requires active compensation into the current waveform (IMON) generated by the power stage and used by the master controller for voltage regulation. The power stages can be configured to perform this compensation since the power transistors in each power stage are independent from one another and have their own temperature characteristics. However, the power stages being configured to perform this compensation may require additional circuit components that occupy circuit board space.

Figure 1:
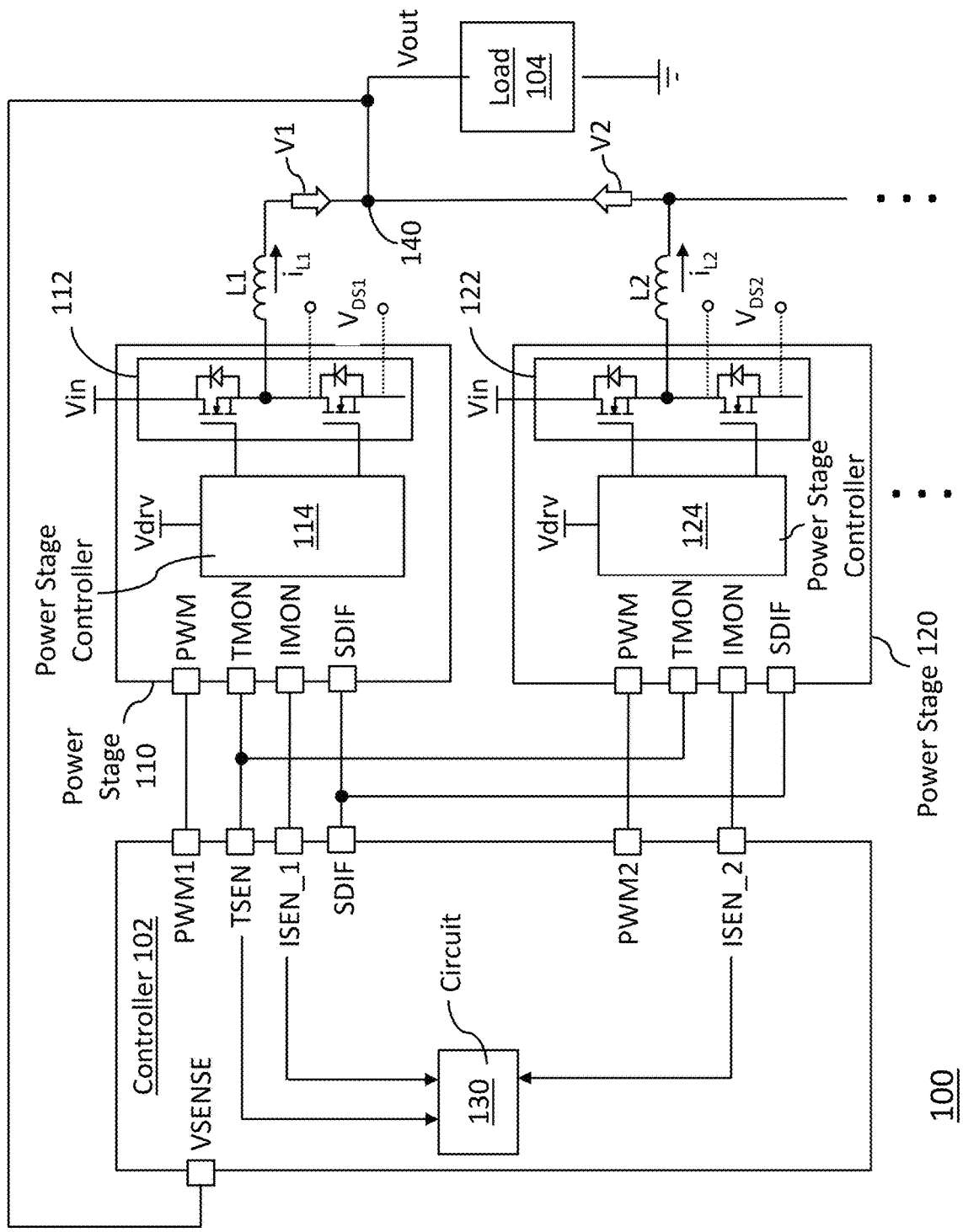
FIG. 1 is a diagram showing an example system that can implement remote current sense compensation in multiphase voltage regulators in one embodiment.

FIG. 1 is a diagram showing an example system that can implement remote current sense compensation in multiphase voltage regulators in one embodiment. The system 100 may be an apparatus implementing a multiphase voltage regulator including a controller 102 and at least one voltage regulators or power stages, such as a power stage 110 and a power stage 120. In an example, the controller 102 may be a master controller, or a multiphase controller, and the power stages 110, 120 may include DC-DC converters. The controller 102 may be configured to control the power stage 110 using a pulse width modulation (PWM) signal PWM1 being sent from the controller 102 to the PWM pin of the power stage 110. The power stage 110 may include a power transistor pair 112 and a power stage controller 114. The power transistor pair 112 may include a high side field-effect transistor (FET) and a low side FET. The PWM1 signal can be a control signal that switches the power transistor pairs 112 to convert an input voltage Vin into an output voltage V1.

The controller 102 may be configured to control the power stage 120 using another PWM signal PWM2 being sent from the controller 102 to the PWM pin of the power stage 120. The power stage 120 may include a power transistor pair 122 and a power stage controller 124. The power transistor pair 122 may include a high side FET and a low side FET. The PWM2 signal can be a control signal that switches the power transistor pairs 122 to convert an input voltage Vin into an output voltage V2. The output voltages V1 and V2 can be combined or interleaved at a node 140 to produce an overall output voltage Vout to a load 104. In an example, the waveforms representing PWM1 and PWM2 can be staggered, or out of phase from one another.

In one or more examples, the power stages 110, 120 may be current-sourced devices, voltage-sourced devices, or a device implementing both current and voltage-sourced control. In an example, the power stages 110, 120 may be smart power stage (SPS) devices configured to perform voltage regulation with additional features such as feedback control based on feedback voltage and/or feedback current, or other parameters such as temperature, measured at the outputs of the power stages in the system 100. For example, the power stages 110, 120 can provide operating temperatures of the power stages 110, 120 from the TMON pin of the power stages 110, 120 to a TSEN pin of the controller 102. In another example, the power stages 110, 120 can measure inductor currents $i_{L1}$, $i_{L2}$, of the inductors L1, 12 from nodes 117, 127, respectively. The power stages 110, 120 can provide the measured inductor current to the controller 102 from their IMON pins of the power stages 110, 120 to the ISEN_1 and ISEN_2 pins of the controller 102, respectively. Further, a measurement of the output voltage Vout can be fed back to the controller 102 (e.g., received at a VSENSE pin of the controller 102) for various control applications.

In an aspect, the power stage controllers 114, 124, of the power stages 110, 120 can be configured to process the measured parameters of the power stages 110, 120, respectively, before providing the measured parameters to the controller 102. For example, the power stage controllers 114, 124 can amplify and/or calibrate the measured parameters prior to providing them to the controller 102. The power stage controllers 114, 124 can also include drivers configured to drive the power transistor pairs 112, 122 of the power stages 110, 120, respectively.

In an example, the controller 102 can be a microcontroller including hardware component such as integrated circuits (IC), memory devices, and other hardware and circuit components. The controller 102 can receive current and/or temperature information from the power stages 110, 120. The controller 102 can be configured to use the received current and/or temperature information to control and maintain the performance of the system 100 at a satisfying level (e.g., within specifications). For example, if the current information returned from the power stages 110, 120 indicates the load 104 is not drawing as much current as expected, the controller 102 can deactivate one or more power stages in the system 100 to reduce an overall power consumption of the system 100.

In an aspect, the controller 102 can enable the power stages in the system 100 individually based on the PWM signals such as PWM1 and PWM2. For example, if the power stage controller 114 detects activity on the PWM pin of the power stage 110, then the power stage 110 is enabled. If the power stage controller 124 detects no activity on the PWM pin of the power stage 120, then the power stage 120 is disabled. A bus or trace communicating the PWM signals from the controller 102 to the power stages 110, 120 may be reserved for providing PWM signals to enable or disable (activate or deactivate) power stages, and not configured for communicating other types of commands or information. For example, the controller 102 cannot use the bus reserved for the PWM signals to send requests or to provide control signals and commands to individual power stages.

In an aspect, the inductor current being outputted from an IMON pin of a power stage can change based on a corresponding power stage's drain-source on-state resistance $R_{DS(on)}$, and $R_{DS(on)}$ varies with an operating temperature of the power stage. Each power stage in the system 100 can be configured to measure a voltage $V_{DS}$ across the low-side power transistor of their respective power transistor pairs. For example, the power stages 110, 120 can be configured to measure $V_{DS1}$ and $V_{DS2}$ across the low-side power transistor of the power transistor pairs 112, 122, respectively. Based on the measured $V_{DS1}$ and $V_{DS2}$ of the power stages 110, 120, $R_{DS(on)}$ for each one of the power stages 110, 120, can be determined. The value of $R_{DS(on)}$ can be proportional to $V_{DS}$, and can vary proportionally with a temperature of the power stage in a non-linear manner. Therefore, as the operating temperature of a power stage changes, the value of $R_{DS(on)}$ can change and the inductor currents $i_{L1}$, $i_{L2}$, can also change in response to changes in $R_{DS(on)}$. With a potentially wide range of operating temperatures detectable at the power stages, it may be impractical for the controller 102 and the power stages to store mappings between different values of $R_{DS(on)}$ and temperature for each power stage. In an aspect, the $R_{DS(on)}$ of each power stage can be used by the controller 102 to perform loop performance, system telemetry reporting, fault protection, and/or other applications relating maintenance and control of one or more devices in the system 100.

In order for the controller 102 to be able to send request, and provide commands, to individual power stages, a digital communication bus labeled as SDIF in FIG. 1 can be integrated in the controller 102 and each power stage in the system 100. The SDIF bus can be a two-wire serial communication bus configured for communication digital signals (e.g., bit stream having a sequence of bits). The controller 102, and the power stage controllers 114, 124, can include logic circuits configured to interpret signals carried by the SDIF bus. By utilizing the SDIF bus to communicate commands and requests, the controller 102 can individually control the power stages and request information from individual power stages.

For example, the controller 102 can send requests for temperature information to a specific power stage, such as an operating temperature of one of the power stages 110, 120, using the SDIF communication interface. The controller 102 can receive the temperature information from the specific power stage's TMON pin. An integrated circuit (or circuit) 130 can be integrated in the controller 102, where the circuit 130 can be configured to estimate or predict $R_{DS(on)}$ of a sensing transistor (e.g., the low-side transistor in the specific power stage) of the specific power stage based on the temperature information. The controller 102 can use the predicted $R_{DS(on)}$ to determine a correction factor for the corresponding inductor current, and correct the inductor current using the determined correction factor. As a result of integrating the circuit 130 in the controller 102 to calibrate the inductor current of individual power stages based on individual temperature information, circuit components in the power stages being used for calibrating the inductor current can be removed.

Figure 2:
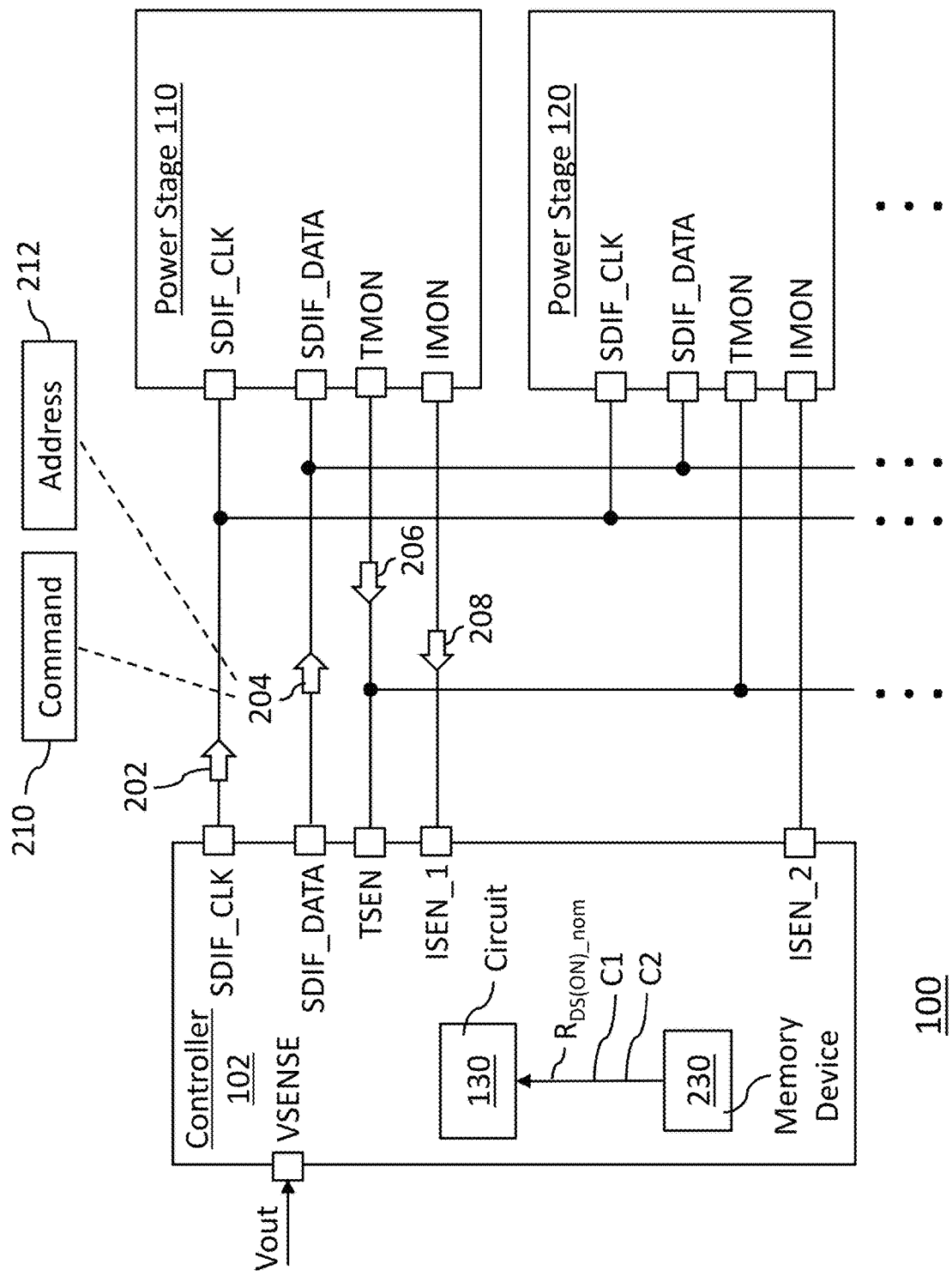
FIG. 2 is a diagram showing an example implementation of remote current sense compensation in multiphase voltage regulators in one embodiment.

FIG. 2 is a diagram showing an example implementation of remote current sense compensation in multiphase voltage regulators in one embodiment. In the example shown in FIG. 2, the SDIF bus has a two-wire interface including a clock line labeled as SDIF_CLK and a data line labeled as SDIF_DATA. The SDIF_CLK line can be a bus or trace carrying a clock signal 202 from the controller 102 to the power stages in the system 100. The clock signal 202 can be a clock signal that coordinates operations of the controller 102 and the power stages in the system 100 with signals being carried by the SDIF_DATA line. The SDIF_DATA bus or line can be a bidirectional data line (e.g., open-drain) that allows the controller 102 and the power stages of the system 100 to exchange various data and information. In one embodiment, the SDIF_DATA line can be driven on a rising edge of the clock signal 202 on the SDIF_CLK line, and can be sampled on a falling edge of the clock signal 202 on the SDIF_CLK line.

In an embodiment, the controller 102 can generate a data packet 204 and send the data packet 204 to all power stages of the system 100 using the SDIF bus. The data packet 204 can include a command 210 and an address 212. In one embodiment, the command 210 and the address 212 can be encoded in different multibit sequence. The command 210 can be a command to instruct one or more power stages in the system 100 to perform a specific task, such as requesting temperature information of one or more power stages in the system 100. The address 212 in the data packet 204 can be an address identifying one or more power stages in the system 100. In one or more embodiments, the data packet 204 can include a parity bit for error checking purposes.

The power stages of the system 100 can receive the same data packet 204, but may or may not perform the task indicated by the command 210 based on the address 212. The power stage controllers in each power stage (e.g., power stage controllers 114, 124 in FIG. 1) of the system 100 can be configured to decode the data packet 204. The power stage controllers can decode the command 210 and the address 212 in order to determine whether to perform a task indicated by the command 210 in response to receiving the data packet 204. For example, if the address 212 identifies the power stage 110, then power stage 110 can perform the task encoded in the command 210 but the power stage 120 may not perform the task encoded in the command 210 even if it received the same data packet 204. If the address 212 identifies a group of power stages including both power stages 110, 120, then both power stages 110, 120 can perform the task encoded in the command 210. If the address 212 identifies all power stages of the system 100, then all power stages of the system 100 can perform the task encoded in the command 210.

In one or more embodiments, each power stage controller can be configured to send an acknowledgement signal to the controller 102, via the SDIF_DATA line, in response to the address 212 identifying its own address, or identifying a group of power stages it belongs to, or identifying all power stages of the system 100. For example, if the address 212 identifies the power stage 110, then the power stage 110 can send an acknowledgement signal to the controller 102 via the SDIF_DATA line in response to receiving the data packet 204, but the power stage 120 may not send the acknowledgment signal. If the address 212 identifies a group of power stages including both power stages 110, 120, then both power stages 110, 120 can send the acknowledgement signal to the controller 102 via the SDIF_DATA line in response to receiving the data packet 204. If the address 212 identifies all power stages of the system 100, then all power stages of the system 100 can send the acknowledgement signal to the controller 102 via the SDIF_DATA line in response to receiving the data packet 204.

In the example shown in FIG. 2, the command 210 in the data packet 204 can be a command to request temperature information from the power stage 110, where the address 212 identifies the power stage 110. The power stage 110 can receive the data packet 204 including the command 210 and the address 212. The power stage controller 114 of the power stage 110 can compare the address 212 with an address assigned to the power stage 110, where the address assigned to the power stage 110 may be stored in a storage element (e.g., registers) of the power stage 110. In response to the address 212 being identical with the address assigned to the power stage 110, the power stage controller 114 of the power stage 110 can send an acknowledgement signal to the controller 102, and perform the task encoded in the command 210 (e.g., provide temperature information 206 to the controller 102). In one embodiment, in response to the address 212 being identical with the address assigned to the power stage 110, the power stage controller 114 of the power stage 110 can activate a connection between its TMON pin and the TSEN pin of the controller 102. In an embodiment, the power stage controller 114 of the power stage 110 can include a temperature sensor configured to detect an operating temperature of the power stage 110. The power stage controller 114 of the power stage 110 can send the operating temperature detected by the temperature sensor from the TMON pin of the power stage 110 to the TSEN pin of the controller 102.

The power stage 120 can also listen to the SDIF_DATA line and receive the data packet 204 including the command 210 and the address 212. The power stage controller 124 of the power stage 120 can compare the address 212 with an address assigned to the power stage 120, where the address assigned to the power stage 120 may be stored in a storage element (e.g., registers) of the power stage 120. In response to the address 212 being different from the address assigned to the power stage 120, the power stage controller 124 of the power stage 120 may continue to operate without performing the task indicated by the command 210. In one embodiment, in response to the address 212 being different from the address assigned to the power stage 120, the power stage controller 124 of the power stage 120 can deactivate (e.g., disconnect) a connection between its TMON pin and the TSEN pin of the controller 102.

The controller 102 can receive the temperature information 206 from the power stage 110, but not the power stage 120 in response to the address identifying the power stage 110. The controller 102 can also receive sensed current information 208 at the ISEN_1 pin from the IMON pin of the power stage 110. The sensed current information 208 can include the inductor current $i_{L1}$ of the inductor L1 (see FIG. 1) connected to an output of the power stage 110. In response to receiving the temperature information 206, the controller 102 can retrieve various predefined parameters stored in a memory device 230 of the controller 102. The predefined parameters being retrieved by the controller 102 can include, for example, a nominal value of $R_{DS(on)}$, labeled as $R_{DS(on)\_nom}$, of the power stage 110 (e.g., the power stage identified by the address 212), a first coefficient C1, and a second coefficient C2.

The nominal value $R_{DS(on)\_nom}$ can be a $R_{DS(on)}$ value that was measured from the power stage 110 at a nominal condition, such as being measured at room temperature or at a nominal temperature defined for a testing environment. In one or more embodiments, the nominal value $R_{DS(on)\_nom}$ can be measured by an automated test equipment (ATE) under the nominal condition. The coefficient C1 can be a coefficient defining a first-order change of the $R_{DS(on)}$ value with respect to operating temperature of the power stage 110. The coefficient C2 can be a coefficient defining a second-order change of the $R_{DS(on)}$ value with respect to operating temperature of the power stage 110. The second-order change can represent a rate of change that is greater than a rate of change represented by the first-order change. In one embodiment, the circuit 130 integrated in the controller 102 can be configured to predict a value of $R_{DS(on)}$, labeled as $R_{DS(on)\_pred}$, using a relationship between $R_{DS(on)}$ and temperature characteristics of a corresponding power stage. In one embodiment, $R_{DS(on)}$ can be predicted based on temperature characteristics of a power stage using a second-order prediction algorithm: $R_{DS(on)\_pred} = R_{DS(on)\_nom} + C1*(T-T_{nom}) + C2*(T-T_{nom})^2$. The parameter T represents the operating temperature in the temperature information 206, and the parameter $T_{nom}$ represents a nominal temperature, such as a room temperature or a nominal temperature defined for a testing environment. In an embodiment, the $T_{nom}$ value of a power stage can be derived from testing a plurality of driver devices or power stage devices having similar temperature characteristics. The nominal condition to measure the nominal value $R_{DS(on)}$ nom and $T_{nom}$ can be the same nominal condition, such as being measured by the same ATE under the same room temperature. Each power stage in the system 100 can have its individual $R_{DS(on)\_nom}$ values, and some power stages can have different or the same C1 and C2 values.

In one embodiment, at startup time of the system 100, the controller 102 may query each power stage to obtain the predefined parameters $R_{DS(on)\_nom}$, $T_{nom}$, C1, and C2, for each power stage. The controller 102 can store the predefined parameters, and mappings between the predefined parameters and identifications of power stages in the system 100, in the memory device 230. During operation of the system 100, the controller 102 can retrieve the stored predefined parameters based on the stored mappings to determine $R_{DS(on)\_pred}$. The controller 102 can be configured to determine $R_{DS(on)\_pred}$ for the power stages in the system 100 sequentially.

The controller 102 can use $R_{DS(on)\_pred}$ to determine a correction factor of a corresponding the inductor current. For example, the controller 102 can determine $R_{DS(on)\_pred}$ for the power stage 110 and compare the $R_{DS(on)\_pred}$ for the power stage 110 with $R_{DS(on)}$ nom of the power stage 110. A result of this comparison can indicate a degree of deviation of the inductor current $i_{L1}$, received at the ISEN_1 pin from the IMON pin of the power stage 110, from an expected inductor current (e.g., a synthesized current generated by a current synthesizer of the controller 102). The controller 102 can use the degree of deviation to determine a correction factor, and use the determined correction factor to adjust the inductor current $i_{L1}$ received at the ISEN_1 pin of the controller 102 before using $i_{L1}$ for other performance control and maintenance applications of the system 100.

In an embodiment, the $T_{nom}$ value of a power stage can be derived from testing a plurality of driver devices or power stage devices having similar temperature characteristics. The nominal condition to measure the nominal value $R_{DS(on)\_nom}$ and $T_{nom}$ can be the same nominal condition, such as being measured by the same ATE under the same room temperature. Each power stage in the system 100 can have its individual $R_{DS(on)\_nom}$ values, and some power stages can have different or the same C1 and C2 values.

In another embodiment, the circuit 130 integrated in the controller 102 can be configured to predict a value of $R_{DS(on)}$, labeled as $R_{DS(on)\_pred}$, using a relationship between $R_{DS(on)}$, temperature characteristics of a power stage, and a gate drive voltage Vdrv being used for driving drivers in the power stage's controller (e.g., controllers 114, 124 in FIG. 1). For example, $R_{DS(on)}$ can be predicted based on temperature characteristics of a power stage and Vdrv using another second-order prediction algorithm: $R_{DS(on)\_pred} = R_{DS(on)\_Vdrv} + C1_{Vdrv}*(T-T_{nom}) + C2_{Vdrv}*(T-T_{nom})^2$. The variable $R_{DS(on)\_Vdrv}$ represents a value of $R_{DS(on)}$ that can be approximated based on changes in Vdrv. The variables $C1_{Vdrv}$ and $C2_{Vdrv}$ represent values of coefficients C1 and C2 that can be approximated based on changes in Vdrv.

$R_{DS(on)}$ can vary with gate drive voltage Vdrv, meaning changes in Vdrv can cause $R_{DS(on)}$ to change as well. Circuit 130 can be configured to determine a $R_{DS(on)}$ calibration value $R_{DS(on)\_cal}$ by 1) measuring a first value of $R_{DS(on)}$ at room temperature when Vdrv is set to a maximum value Vdrv_max, 2) measuring second value of $R_{DS(on)}$ at room temperature when Vdrv is set to a minimum value Vdrv_min, 3) measuring a nominal value of Vdrv, e.g., Vdrv_nom, at room temperature, 4) determining a relationship between $R_{DS(on)}$ and Vdrv using the first and second measured values of $R_{DS(on)}$, Vdrv_max, Vdrv_min, and Vdrv_nom, and 5) approximate $R_{DS(on)\_cal}$ by linear interpolation based on the determined relationship. The circuit 130 can store $R_{DS(on)\_cal}$ in memory device 230.

In an aspect, coefficients C1 and C2 can also vary with gate drive voltage Vdrv. Circuit 130 can be configured to determine calibration values $C1_{cal}$ and $C2_{cal}$ by 1) approximating first values of C1 and C2 at room temperature when Vdrv is set to a maximum value, 2) measuring second values of C1 and C2 at room temperature when Vdrv is set to a minimum value Vdrv_min, 3) measuring a nominal value of Vdrv, e.g., Vdrv_nom, at room temperature, 4) determining a relationship between C1 and Vdrv, and another relationship between C2 and Vdrv, using the first and second measured values of C1 and C2, Vdrv_max, Vdrv_min, and Vdrv_nom, and 5) approximate $C1_{cal}$ and $C2_{cal}$ by linear interpolations based on the determined relationships. The circuit 130 can store $C1_{cal}$ and $C2_{cal}$ in memory device 230.

Circuit 130 can use the approximated calibration values $R_{DS(on)\_cal}$, $C1_{cal}$, and $C2_{cal}$ to determine the variables $R_{DS(on)\_Vdrv}$, $C1_{Vdrv}$, and $C2_{Vdrv}$. Circuit 130 can determine $R_{DS(on)\_Vdrv}$ by executing the expression $R_{DS(on)\_Vdrv}=R_{DS(on)\_nom}+\Delta Vdrv_1$, where $\Delta Vdrv_1 = R_{DS(on)\_cal}*[(Vdrv-Vdrv\_nom)/\pm Vdrv)]$, where Vdrv is a measured Vdrv value (e.g., can be measured more than one time, at different temperature and/or operating conditions) and ±Vdrv represents either Vdrv_max or Vdrv_min. The selection to set ±Vdrv to Vdrv_max or Vdrv_min depends on the deviation of the measured Vdrv from the nominal value Vdrv_nom. For example, if the measured Vdrv is less than Vdrv_nom, then ±Vdrv will be set to Vdrv_min, and if the measured Vdrv is greater than Vdrv_nom, then ±Vdrv will be set to Vdrv_max. Circuit 130 can determine $C1_{Vdrv}$ by executing the expression $C1_{Vdrv}=C1+\Delta Vdrv_2$, where $\Delta Vdrv_2=C1_{Cal}*[(Vdrv-Vdrv\_nom)/+Vdrv)]$. Circuit 130 can determine $C2_{Vdrv}$ by executing the expression $C2_{Vdrv}=C2+\Delta Vdrv_3$, where $\Delta Vdrv_3=C2_{Cal}*[(Vdrv-Vdrv\_nom)/\pm Vdrv)]$. Circuit 130 can use the vales of $R_{DS(on)\_Vdrv}$, $C1_{Vdrv}$, and $C2_{Vdrv}$ in the second-order prediction algorithm $R_{DS(on)\_pred}=R_{DS(on)\_Vdrv}+C1_{Vdrv}*(T-T_{nom})+C2_{Vdrv}*(T-T_{nom})^2$ to predict $R_{DS(on)}$ while factoring in changes in both Vdrv and temperature.

Figure 3:
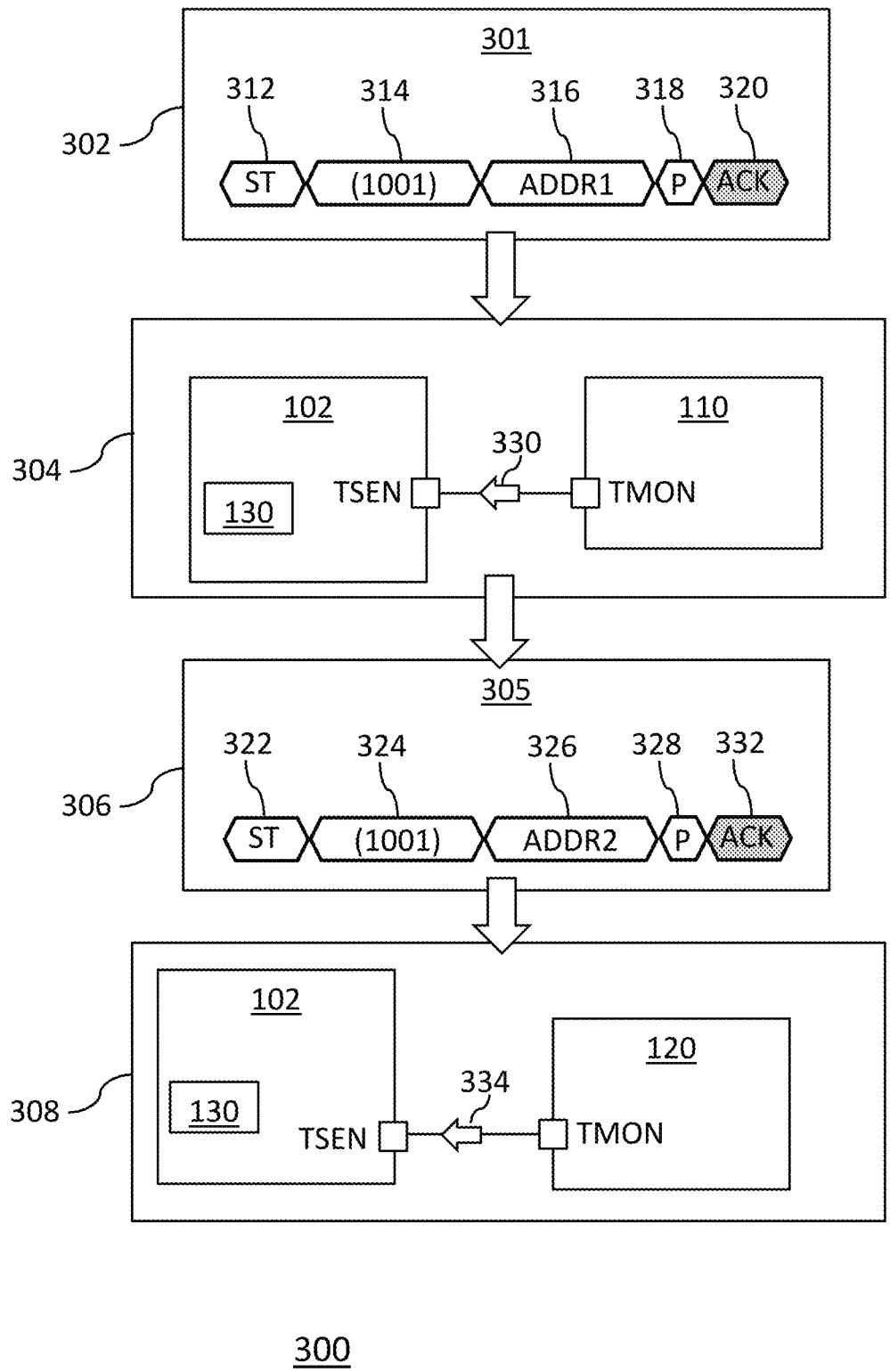
FIG. 3 is a diagram showing an operation to obtain temperature information of different power stages timing diagram sequentially in one embodiment.

FIG. 3 is a diagram showing an operation to obtain temperature information of different power stages timing diagram sequentially in one embodiment. A temperature acquisition operation 300 being performed by the controller 102 of FIG. 1 is shown in FIG. 3. The temperature acquisition operation 300 can include steps 302, 304, 306, 308. At step 302, the controller 102 can encode a temperature acquisition command (1001) in a multibit sequence labeled as command 314. The controller 102 can also encode a target address ADDR1 in another multibit sequence labeled as address 316. The controller 102 can generate a data packet 301 including at least the command 314 and the address 316. The target address ADDR1 can identify a specific power stage, a group of power stages, or all power stages, in the system 100. In the example shown in FIG. 3, the address ADDR1 identifies the power stage 110. The controller 102 can send the data packet 301 to all power stages in the system 100 by using the SDIF_DATA line (see FIG. 2). In one embodiment, the data packet 301 can also include start bits 312, labeled as ST, and a parity bit 318 labeled as P. The start bits 312 can indicate a start of a new command issued by the controller 102, and the parity bit 318 can be included in the data packet 301 for error checking by the power stage that receives the data packet 301.

All power stages in the system 100 can receive the data packet 301 on the SDIF_DATA line, but not all power stages may return the temperature information requested by the command 314. In response to the address ADDR1 identifying the power stage 110, the power stage controller 114 of the power stage 110 can decode the address ADDR1 in the data packet 301 and compare ADDR1 with a power stage address assigned to the power stage 110. In response to ADDR1 being identical to the address assigned to the power stage 110, the power stage controller 114 of the power stage 110 can decode (1001) in the command 314 to determine that the command 314 is a temperature acquisition command. In response to determining that the command 314 is a temperature acquisition command, the power stage controller 114 of the power stage 110 can send an acknowledgement signal ("ACK") 320 to the controller 102 to confirm the power stage 110 will provide temperature information to the controller 102. Note that in the examples shown in FIG. 3, the shaded data (e.g., the ACK 320) are data being sent from a power stage to the controller 102, and the unshaded data (e.g., command 314, address 316, etc.) are data being sent from the controller 102 to one or more power stages on the SDIF_DATA line.

Since the data packet 301 is on the SDIF_DATA line, all power stages (or all enabled power stages) in the system 100 can receive the data packet 301 as well. For example, the power stage controller 124 of the power stage 120 can receive the data packet 301 and decode the address ADDR1 and compare ADDR1 with a power stage address assigned to the power stage 120. In response to ADDR1 being different from the address assigned to the power stage 120, the power stage 120 can continue to operate without decoding the command 314 and without providing any temperature information to the controller 102.

The temperature acquisition operation 300 can proceed from step 302 to step 304. At step 304, the power stage 110 can send temperature information 330 from the TMON pin of the power stage 110 to the TSEN pin of the controller 102. The temperature information 330 can include an operating temperature of the power stage 110. The circuit 130 integrated in the controller 102 can use the temperature information 330 to determine $R_{DS(on)\_pred}$ of the sensing power transistor (e.g., low-side power transistor) in the power transistor pair 112 of the power stage 110 (see FIG. 1). The controller 102 can compare the $R_{DS(on)\_pred}$ for the power stage 110 with $R_{DS(on)\_nom}$ of the power stage 110. A result of this comparison can indicate a degree of deviation of the inductor current $i_{L1}$ (see FIG. 1) from an expected inductor current of the power stage 110. The controller 102 can use the degree of deviation to determine a correction factor, and use the determined correction factor to adjust the inductor current $i_{L1}$ received at the ISEN_1 pin (see FIG. 1) of the controller 102 before using $i_{L1}$ for other performance control and maintenance applications of the system 100.

The temperature acquisition operation 300 can proceed from step 304 to step 306. At step 306, the controller 102 can encode the temperature acquisition command (1001) in a multibit sequence labeled as a command 324. The controller 102 can also encode a target address ADDR2 in a multibit sequence labeled as an address 326. The controller 102 can generate a data packet 305 including at least the command 324 and the address 326. The target address ADDR2 can identify a specific power stage, a group of power stages, or all power stages, in the system 100. In the example shown in FIG. 3, the address ADDR2 identifies the power stage 120. The controller 102 can send the data packet 305 to all power stages in the system 100 by using the SDIF_DATA line (see FIG. 2). In one embodiment, the data packet 305 can also include start bits 322 labeled as ST and a parity bit 328 labeled as P. The start bits 322 can indicate a start of a new command issued by the controller 102, and the parity bit 328 can be included in the data packet 305 for error checking by the power stage that receives the data packet 305.

All power stages in the system 100 can receive the data packet 305 on the SDIF_DATA line, but not all power stages may return the temperature information requested by the command 324. In response to the address ADDR2 identifying the power stage 120, the power stage controller 124 of the power stage 120 can decode the address ADDR2 in the data packet 305 and compare ADDR2 with a power stage address assigned to the power stage 120. In response to ADDR2 being identical to the address assigned to the power stage 120, the power stage controller 124 of the power stage 120 can decode (1001) in the command 324 to determine that the command 324 is a temperature acquisition command. In response to determining that the command 324 is a temperature acquisition command, the power stage controller 124 of the power stage 120 can send an acknowledgement signal ("ACK") 332 to the controller 102 to confirm the power stage 120 will provide temperature information to the controller 102.

Since the data packet 305 is on the SDIF_DATA line, all power stages (or all enabled power stages) in the system 100 can receive the data packet 305 as well. For example, the power stage controller 114 of the power stage 110 can receive the data packet 305 and decode the address ADDR2 and compare ADDR2 with the power stage address assigned to the power stage 110. In response to ADDR2 being different from the address assigned to the power stage 110, the power stage 110 can continue to operate without decoding the command 324 and without providing any temperature information to the controller 102.

The temperature acquisition operation 300 can proceed from step 306 to step 308. At step 308, the power stage 120 can send temperature information 334 from the TMON pin of the power stage 120 to the TSEN pin of the controller 102. The temperature information 334 can include an operating temperature of the power stage 120. The circuit 130 integrated in the controller 102 can use the temperature information 334 to determine $R_{DS(on)\_pred}$ of the sensing power transistor (e.g., low-side power transistor) in the power transistor pair 122 of the power stage 120 (see FIG. 1). The controller 102 can compare the $R_{DS(on)\_pred}$ for the power stage 120 with $R_{DS(on)\_nom}$ of the power stage 120. A result of this comparison can indicate a degree of deviation of the inductor current $i_{L2}$ (see FIG. 1) from an expected inductor current of the power stage 120. The controller 102 can use the degree of deviation to determine a correction factor, and use the determined correction factor to adjust the inductor current $i_{L2}$ received at the ISEN_2 pin (see FIG. 1) of the controller 102 before using $i_{L2}$ for other performance control and maintenance applications of the system 100. The controller 102 can proceed to obtain temperature information of other power stages in the system 100 in a similar sequential manner as shown in FIG. 3.

By configuring the controller 102 to remotely and individually performing current sense compensation for the power stages in the system 100, the circuit components in the power stages for temperature compensation can be removed, preserving circuit board space in the power stages and the system 100. Further, the power stages may no longer need to perform the temperature compensation, reducing power consumption by the power stages. For example, power stages that implement 5-volt logic can be relatively expensive due to its board area and can consume a relatively large amount of power for the complexity of calculations needed to correct the sensed current. By moving these calculations to the master controller, the cost in area and power consumption of the power stages can be reduced.

Figure 4:
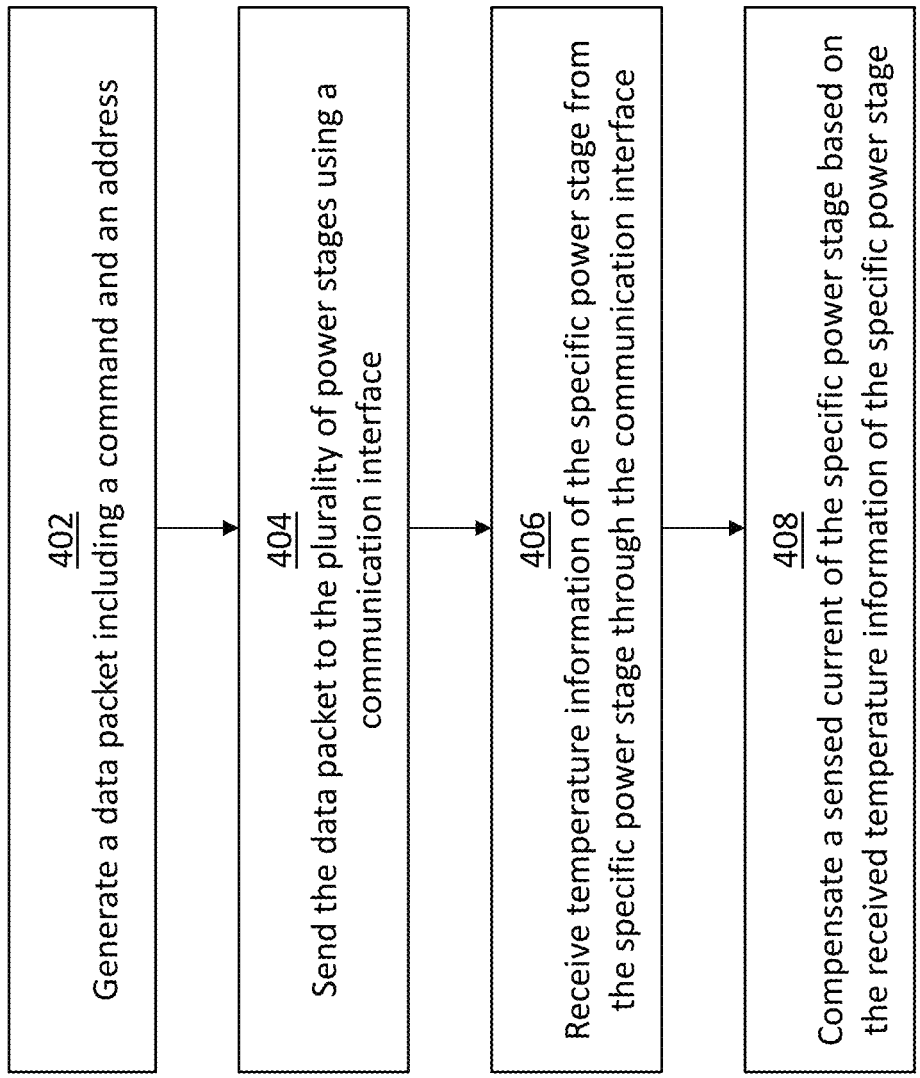
FIG. 4 is a flowchart of an example process that may implement remote current sense compensation in multiphase voltage regulators according to an embodiment of the disclosure.

FIG. 4 is a flowchart of an example process 400 that may implement remote current sense compensation in multiphase voltage regulators according to an embodiment of the disclosure. The process 400 can include one or more operations, actions, or functions as illustrated by one or more of blocks 402, 404, 406, and/or 408. Although illustrated as discrete blocks, various blocks can be divided into additional blocks, combined into fewer blocks, eliminated, performed in different order, or performed in parallel, depending on the desired implementation.

The process 400 can be performed by a controller (e.g., controller 102 in FIG. 1 to FIG. 3) connected to a plurality of power stages, through a communication interface, in a multiphase voltage regulator. The process 400 can begin at block 402. At block 402, the controller can generate a data packet including a command and an address. The command can be a command to obtain temperature information. The address can be an address that identifies a specific power stage among the plurality of power stages. In one embodiment, the controller can encode the command in a first multibit sequence and encode the address in a second multibit sequence.

The process 400 can proceed from block 402 to block 404. At block 404, the controller can send the data packet to the plurality of power stages using a communication interface. In one embodiment, the communication interface can be a serial and digital communication interface including a clock line and a data line, and the data packet can be sent to the plurality of power stages through the data line.

The process 400 can proceed from block 404 to block 406. At block 406, the controller can receive temperature information of the specific power stage from the specific power stage through the communication interface. In one embodiment, the temperature information can include an operating temperature of the specific power stage.

The process 400 can proceed from block 406 to block 408. At block 408, the controller can compensate a sensed current of the specific power stage based on the received temperature information of the specific power stage. In one embodiment, the controller can determine a predicted drain-source on-state resistance of a sensing transistor of the specific power stage. The determination of the predicted drain-source on-state resistance can be based on a nominal predicted drain-source on-state resistance of the sensing transistor of the specific power stage, the received temperature information, a first-order temperature coefficient, and a second-order temperature coefficient. The controller can compensate the sensed current of the specific power stage based on the predicted drain-source on-state resistance.

In one embodiment, in response to the compensation of the sensed current of the specific power stage, the controller can generate a new data packet that includes the command to obtain temperature information and a new address that identifies another power stage among the plurality of power stages. The controller can send the new data packet to the plurality of power stages using the communication interface. The controller can receive new temperature information of the new power stage from the new power stage through the communication interface. The controller can compensate a sensed current of the new power stage based on the new temperature information of the new power stage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a communication interface; and
a controller connected to a plurality of power stages through the communication interface, the controller being configured to:
send a data packet to digital interfaces of the plurality of power stages using the communication interface, wherein the data packet comprises at least one multi-bit sequence encoding:
a command to obtain temperature information; and
an address that identifies a specific power stage among the plurality of power stages;
receive, at a temperature sensing pin of the controller, temperature information of the specific power stage from a temperature monitor pin of the specific power stage; and
compensate a sensed current of the specific power stage based on the temperature information received from the specific power stage and based on at least one temperature characteristic of the specific power stage.

2. The apparatus of claim 1, wherein the communication interface is a serial and digital communication interface comprising a clock line and a data line, and the data packet is sent to the plurality of power stages through the data line.

3. The apparatus of claim 1, wherein the command is encoded in a first multibit sequence and the address is encoded in a second multibit sequence.

4. The apparatus of claim 1, wherein the controller is configured to:
determine a predicted drain-source on-state resistance of a sensing transistor of the specific power stage; and
compensate the sensed current of the specific power stage based on the predicted drain-source on-state resistance.

5. The apparatus of claim 4, wherein the determination of the predicted drain-source on-state resistance is based on a nominal predicted drain-source on-state resistance of the sensing transistor of the specific power stage, the received temperature information, a first-order temperature coefficient, and a second-order temperature coefficient.

6. The apparatus of claim 1, wherein the temperature information includes an operating temperature of the specific power stage.

7. The apparatus of claim 1, wherein the controller is configured to, in response to the compensation of the sensed current of the specific power stage:
send another data packet to the digital interfaces of the plurality of power stages using the communication interface, wherein said another data packet comprises at least one multi-bit sequence encoding:
the command to obtain temperature information; and
another address that identifies another power stage among the plurality of power stages;
receive, at the temperature sensing pin of the controller, temperature information of said another power stage from a temperature monitor pin of said another power stage; and
compensate a sensed current of said another power stage based on the temperature information received from said another power stage and based on at least one temperature characteristic of said another power stage.

8. A system comprising:
a communication interface;
a plurality of power stage; and
a controller connected to the plurality of power stages through the communication interface, the controller being configured to:
send a data packet to digital interfaces of the plurality of power stages using the communication interface, wherein the data packet comprises at least one multi-bit sequence encoding:
a command to obtain temperature information; and
an address that identifies a specific power stage among the plurality of power stages;
receive, at a temperature sensing pin of the controller, temperature information of the specific power stage from a temperature monitor pin of the specific power stage; and
compensate a sensed current of the specific power stage based on the temperature information received from the specific power stage and based on at least one temperature characteristic of the specific power stage.

9. The system of claim 8, wherein the communication interface is a serial and digital communication interface comprising a clock line and a data line, and the data packet is sent to the plurality of power stages through the data line.

10. The system of claim 8, wherein the command is encoded in a first multibit sequence and the address is encoded in a second multibit sequence.

11. The system of claim 8, wherein the controller is configured to:
determine a predicted drain-source on-state resistance of a sensing transistor of the specific power stage; and
compensate the sensed current of the specific power stage based on the predicted drain-source on-state resistance.

12. The system of claim 11, wherein the determination of the predicted drain-source on-state resistance is based on a nominal predicted drain-source on-state resistance of the sensing transistor of the specific power stage, the received temperature information, a first-order temperature coefficient, and a second-order temperature coefficient.

13. The system of claim 8, wherein the temperature information includes an operating temperature of the specific power stage.

14. The system of claim 8, wherein the controller is configured to, in response to the compensation of the sensed current of the specific power stage:
send another data packet to the digital interfaces of the plurality of power stages using the communication interface, wherein said another data packet comprises at least one multi-bit sequence encoding:
the command to obtain temperature information; and
another address that identifies another power stage among the plurality of power stages;
receive, at the temperature sensing pin of the controller, temperature information of said another power stage from a temperature monitor pin of said another power stage; and
compensate a sensed current of said another power stage based on the temperature information received from said another power stage and based on at least one temperature characteristic of said another power stage.

15. A method for performing current sense compensation for one or more power stages in a multiphase voltage regulator, the method comprising:
generating, by a controller connected to a plurality of power stages though a communication interface, a data packet comprising at least one multi-bit sequence encoding:
a command to obtain temperature information; and
an address that identifies a specific power stage among the plurality of power stages;
sending, by the controller, the data packet to digital interfaces of the plurality of power stages using the communication interface;
receiving, by a temperature sensing pin of the controller, temperature information of the specific power stage from a temperature monitor pin of the specific power stage; and
compensating, by the controller, a sensed current of the specific power stage based on the temperature information received from the specific power stage and based on at least one temperature characteristic of the specific power stage.

16. The method of claim 15, wherein the communication interface is a serial and digital communication interface comprising a clock line and a data line, and the data packet is sent to the plurality of power stages through the data line.

17. The method of claim 15, further comprising:
encoding, by the controller, the command in a first multibit sequence; and
encoding, by the controller, the address in a second multibit sequence.

18. The method of claim 15, wherein compensating the sensed current comprises:
determining, by the controller, a predicted drain-source on-state resistance of a sensing transistor of the specific power stage, wherein determining the predicted drain-source on-state resistance is based on a nominal predicted drain-source on-state resistance of the sensing transistor of the specific power stage, the received temperature information, a first-order temperature coefficient, and a second-order temperature coefficient; and
compensating, by the controller, the sensed current of the specific power stage based on the predicted drain-source on-state resistance.

19. The method of claim 15, wherein the temperature information comprises an operating temperature of the specific power stage.

20. The method of claim 15, further comprising, in response to the compensation of the sensed current of the specific power stage:
generating, by the controller, another data packet comprising at least one multi-bit sequence encoding:
the command to obtain temperature information;
another address that identifies another power stage among the plurality of power stages;
sending, by the controller, said another data packet to the digital interfaces the plurality of power stages using the communication interface;
receiving, by the temperature sensing pin of the controller, temperature information of said another power stage from a temperature monitor pin of said another power stage; and
compensating, by the controller, a sensed current of said another power stage based on the temperature information received from said another power stage and based on at least one temperature characteristic of said another power stage.

* * * * *